(12) United States Patent
Brodsky et al.

(10) Patent No.: US 8,085,293 B2
(45) Date of Patent: Dec. 27, 2011

(54) SELF ADJUSTING STEREO CAMERA SYSTEM

(75) Inventors: Tomas Brodsky, Croton-on-Hudson, NY (US); Mi-Suen Lee, Ossining, NY (US); Eric Cohen-Solal, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 568 days.

(21) Appl. No.: 09/808,377

(22) Filed: Mar. 14, 2001

(65) Prior Publication Data
US 2002/0158984 A1    Oct. 31, 2002

(51) Int. Cl.
*H04N 13/02*    (2006.01)

(52) U.S. Cl. .............. 348/49; 348/46; 348/51; 348/169; 348/340

(58) Field of Classification Search .............. 348/42–60, 348/340, 169–172, 344–356; 396/77, 78; 359/470, 471, 472, 473, 476
See application file for complete search history.

(56) References Cited

U.S. PATENT DOCUMENTS

| | | | | |
|---|---|---|---|---|
| 2,413,996 A | * | 1/1947 | Ramsdell | 396/331 |
| 3,784,738 A | * | 1/1974 | Natter | 348/49 |
| 3,959,580 A | * | 5/1976 | Chocol et al. | 348/42 |
| 4,568,970 A | * | 2/1986 | Rockstead | 348/49 |
| 4,751,570 A | * | 6/1988 | Robinson | 348/47 |
| 4,878,080 A | * | 10/1989 | Takehana et al. | 396/78 |
| 5,003,385 A | * | 3/1991 | Sudo | 348/49 |
| 5,101,268 A | * | 3/1992 | Ohba | 348/43 |
| 5,142,642 A | * | 8/1992 | Sudo | 348/47 |
| 5,383,013 A | * | 1/1995 | Cox | 356/2 |
| 5,499,051 A | * | 3/1996 | Suda et al. | 348/218.1 |
| 5,532,777 A | * | 7/1996 | Zanen | 396/326 |
| 5,631,697 A | * | 5/1997 | Nishimura et al. | 348/172 |
| 5,671,450 A | * | 9/1997 | Suzuki | 396/227 |
| 5,682,198 A | * | 10/1997 | Katayama et al. | 348/47 |
| 5,740,337 A | * | 4/1998 | Okino et al. | 345/419 |
| 5,864,360 A | * | 1/1999 | Okauchi et al. | 348/47 |
| 5,978,143 A | * | 11/1999 | Spruck | 348/47 |
| 6,094,215 A | * | 7/2000 | Sundahl et al. | 348/42 |

(Continued)

FOREIGN PATENT DOCUMENTS

EP    0696144 A2    7/1996

(Continued)

OTHER PUBLICATIONS

Wren C.R., et al., "Pfinder: Real-Time Tracking of the Human Body", IEEE Transactions on Pattern Analysis and Machine Intelligence, vol. 19, No. 7, Jul. 1997, pp. 780-785.

(Continued)

*Primary Examiner* — Lin Ye
*Assistant Examiner* — Chriss Yoder, III

(57) ABSTRACT

A stereo camera system including: a stereo imaging system such as two or more cameras or a camera and a set of angled mirrors, for outputting at least one stereo image; a recognition system for locating an object of interest in the field of view of the stereo imaging system and at least one of a distance of the object of interest from the stereo imaging system and the size of the object of interest; and an adjustor for automatically changing at least one system parameter which affects the spatial resolution of the object of interest based on at least one of the located distance of the object of interest from the stereo imaging system and the size of the object of interest.

12 Claims, 3 Drawing Sheets

U.S. PATENT DOCUMENTS

| | | | |
|---|---|---|---|
| 6,141,036 A * | 10/2000 | Katayama et al. | 348/47 |
| 6,172,706 B1 | 1/2001 | Tatsumi | |
| 6,326,994 B1 * | 12/2001 | Yoshimatsu | 348/46 |
| 6,363,225 B1 * | 3/2002 | Sugawara | 396/331 |
| 6,545,702 B1 * | 4/2003 | Konolige et al. | 348/36 |
| 6,593,969 B1 * | 7/2003 | Morrow et al. | 348/335 |
| 6,643,396 B1 * | 11/2003 | Hendriks et al. | 382/154 |
| 6,762,794 B1 * | 7/2004 | Ogino | 348/262 |
| 6,809,771 B1 * | 10/2004 | Hamaguchi et al. | 348/335 |
| 6,819,488 B2 * | 11/2004 | Zanen | 359/464 |
| 7,015,951 B1 * | 3/2006 | Yoshigahara et al. | 348/207.99 |
| 7,050,624 B2 * | 5/2006 | Dialameh et al. | 382/154 |
| 7,209,161 B2 * | 4/2007 | Thal et al. | 348/42 |
| 7,388,598 B2 * | 6/2008 | Lee et al. | 348/42 |

FOREIGN PATENT DOCUMENTS

| | | |
|---|---|---|
| EP | 0830034 A | 3/1998 |
| JP | 60152193 A | 8/1985 |
| JP | 62122493 A | 6/1987 |

OTHER PUBLICATIONS

Rowley H.A., et al., "Rotation Invariant Neural Network-Based Face Detection".

Dhond U.R., et al., "Structure from Stereo-A Review", IEEE Transactions on Systems, Man, and Cybernetics, vol. 19, No. 6, Nov./Dec. 1989, pp. 1489-1510.

Lipton A.J., et al., "Moving Target Classification and Tracking from Real-time Video", IEEE Computer Society Conference on Computer Vision and Pattern Recognition, Jun. 1998.

* cited by examiner

SELF ADJUSTING STEREO CAMERA SYSTEM

BACKGROUND OF THE INVENTION

1. Field of the Invention

The present invention relates generally to stereo camera systems and, more particularly, to stereo camera systems which automatically self adjust to increase the resolution of an object of interest based on a detected distance of the object of interest from the camera and/or a detected size of the object of interest.

2. Prior Art

Various imaging systems have been developed in the art to produce stereoscopic or 3D images. These systems generally consist of a method for creating two images as seen from a different perspective and means for displaying the images so that one eye sees one perspective of the image and the other eye sees a different perspective of the image to produce a 3D image.

One method is based on the use of separate spaced apart optical means to produce two perspectives of the same image. The images are displayed side by side, such as on film or on a monitor. Means are provided so that the left eye sees only one image and the right eye sees only the other image so that the image as processed by the brain appears as a stereoscopic image. Thus, Stereographic photography is the method of producing images which are apparently three dimensional by recording separate left- and right-eye images. The viewer reconstructs the 3-D image by viewing the two separate 2-D images simultaneously.

Such stereo views have historically been created with a single camera and mirrors or with two or more cameras mounted on a platform. In such systems, parameters which affect the spatial resolution of the object of interest are generally adjustable, such as the pan and tilt of the cameras and the distance between the cameras (also known as the baseline). However, in the prior art stereo camera systems, these parameters are adjusted before use and remain the same throughout the period of operation, thus, no improvement in spatial resolution is made during operation. The reason for selecting and fixing these parameters is a tradeoff between spatial resolution and operational range, so as to increase the space in which an object of interest can move about.

In view of the prior art, there is a need for a stereo camera system, which resolves these and other problems with the prior art stereo camera systems.

SUMMARY OF THE INVENTION

Therefore it is an object of the present invention to provide a stereo camera system which improves spatial resolution during the mode of operation of the stereo camera system but which does not decrease the operational range of the system.

Accordingly, A stereo camera system is provided. The stereo camera system comprises: a stereo imaging means for outputting at least one stereo image; recognition means for locating an object of interest in the field of view of the stereo imaging means and at least one of a distance of the object of interest from the stereo imaging means and the size of the object of interest; and adjusting means for automatically changing at least one system parameter which affects the spatial resolution of the object of interest based on at least one of the located distance of the object of interest from the stereo imaging means and the size of the object of interest.

In a first configuration of the stereo camera system, the stereo imaging means comprises: a camera; and a set of mirrors angled with respect to each other at a predetermined angle and disposed a predetermined distance from the camera for producing a stereo effect in the output of the camera. In which case, the adjusting means preferably comprises at least one of: angle adjustment means for adjusting the predetermined angle between the set of mirrors; distance adjustment means for adjusting the predetermined distance between the camera and the set of mirrors; and focal length adjustment means for changing a focal length of the camera.

In a second configuration of the stereo camera system, the stereo imaging means comprises two or more cameras, each camera being angled a predetermined angle and distanced a predetermined distance with respect to each other and the object of interest. In which case, the adjusting means preferably comprises at least one of: angle adjustment means for adjusting the predetermined angle of at least one of the two or more cameras; baseline adjustment means for adjusting the predetermined distance between the two or more cameras; distance adjusting means for adjusting a distance between at least one of the two or more cameras and the object of interest; and focal length adjustment means for changing a focal length of at least one of the two or more cameras.

In either of the first or second configurations of the stereo camera system, the cameras can be still cameras where the at least one stereo image is a still image or video cameras where the at least one stereo image is a sequence of video images.

Additionally, in either of the first or second configurations of the stereo camera system, the same preferably further comprises a controller for controlling at least one of the angle, distance, and focal length adjustment means based on an input signal from the recognition means. The recognition means is preferably a stereo vision system.

Also provided is a stereo camera system for use with a stereo imaging means, such as the first and second configurations discussed above. The stereo camera system comprising: recognition means for locating an object of interest in the field of view of the stereo imaging means and at least one of a distance of the object of interest from the stereo imaging means and the size of the object of interest; and adjusting means for automatically changing at least one system parameter which affects the spatial resolution of the object of interest based on at least one of the located distance of the object of interest from the stereo imaging means and the size of the object of interest.

Still yet provided is a method for adjusting a stereo camera system to control spatial resolution of an object of interest in the field of view of a stereo imaging means. The method comprises the steps of: outputting at least one image from the stereo imaging means; locating an object of interest in the field of view of the stereo imaging means and at least one of the distance of the object of interest from the stereo imaging means and the size of the object of interest; and automatically changing at least one system parameter which affects the spatial resolution of the object of interest based on at least one of the located distance of the object of interest from the stereo imaging means and the size of the object of interest.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of stereo imaging means for producing a stereo image, it has been found particularly useful in the environment of stereo camera systems having fixed mirrors or two or more cameras. Therefore, without limiting the applicability of the invention to stereo imaging means having fixed mirrors or two or more cameras, the invention will be described in such environment.

Figure 1:
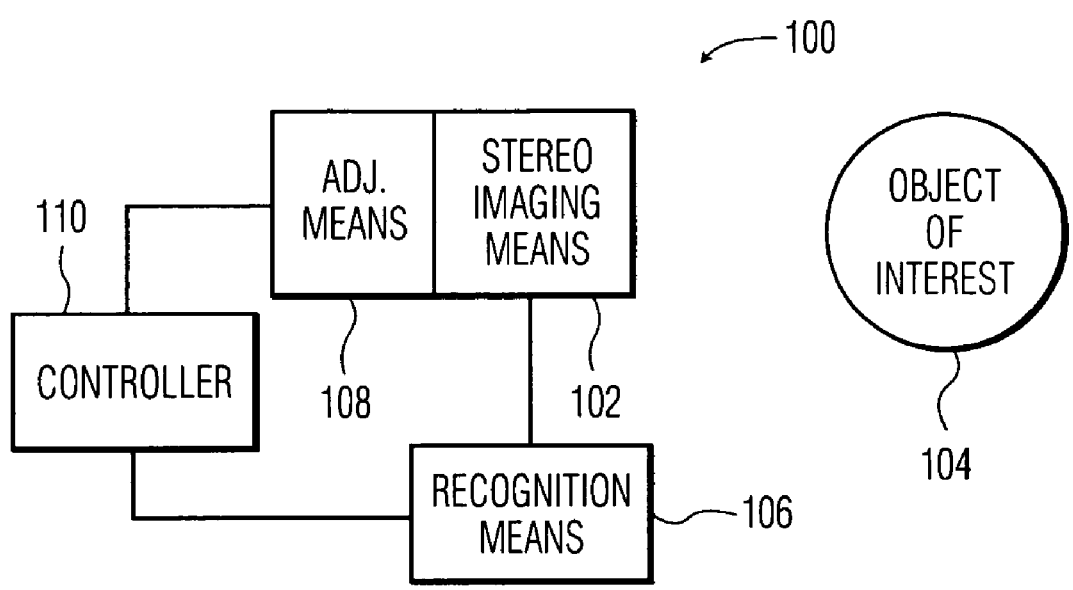
FIG. 1 illustrates a schematic representation of the stereo camera system of the present invention

Referring now to FIG. 1, there is illustrated a schematic of a stereo camera system, generally referred to by reference numeral 100. The stereo camera system comprises a stereo imaging means 102 for outputting at least one stereo image of an object of interest 104 located in the field of view of the stereo imaging means 102. A recognition means locates the object of interest 104 and calculates the distance of the object of interest 104 from the stereo imaging means 102 and/or the size of the object of interest 104. An adjusting means 108 is provided for automatically changing at least one system parameter which affects the spatial resolution of the object of interest 104 based on at least one of the located distance of the object of interest 104 from the stereo imaging means 102 and the size of the object of interest 104. Preferably, the adjustment means is under the control of a controller 110 which determines the amount or degree of adjustment of one or more of the system parameters based on the information from the recognition means 106.

The recognition means 106 can detect the object of interest 104 according to prior knowledge of the object of interest 104 such as by its typical size, shape, and color. Such systems are well known in the art and include those described in, C. Wren et al., "Pfinder: Real-time Tracking of the Human Body," IEEE Transaction on Pattern Analysis and Machine Intelligence (PAMI), 19(7):780-785, July 1997; H. Rowley et al., "Rotation Invariant Neural Network-Based Face Detection," Proc. IEEE Conference on Computer Vision and Pattern Recognition, pp. 38-44, June 1998; and A. Lipton et al., "Moving Target Classification and Tracking from Real-Time Video," Proc. IEEE Workshop on Application of Computer Vision, pp. 8-14, October 1998.

The recognition means 106 can also detect the object of interest 104 automatically, with the use of a stereo vision system which analyzes image data from the stereo imaging means 102. These types of recognition means 106 are preferred because the field of view can be adjusted to cover a large three dimensional area and objects of interest 104 can be detected as foreground objects closest to the stereo imaging means 102. Stereo vision systems are well known in the art and generally operate by first recovering the internal parameters of the cameras, and external parameters between the cameras. For all stereo images taken at the same time, features are extracted and matched across different views. From the matching and the camera parameters, the depth of various points in the scene can be computed. A detail review of research work on stereo can be found in U.R. Dhond et al., "Structure from Stereo—A Review", IEEE Transaction on Systems, Man, and Cybernetics, vol. 19, pp. 1489-1510, 1989.

The stereo imaging means, adjustment means, and controller will now be discussed in detail with regard to a first and second configuration of the stereo camera system, illustrated in FIGS. 2 and 3, respectively.

Figure 2:
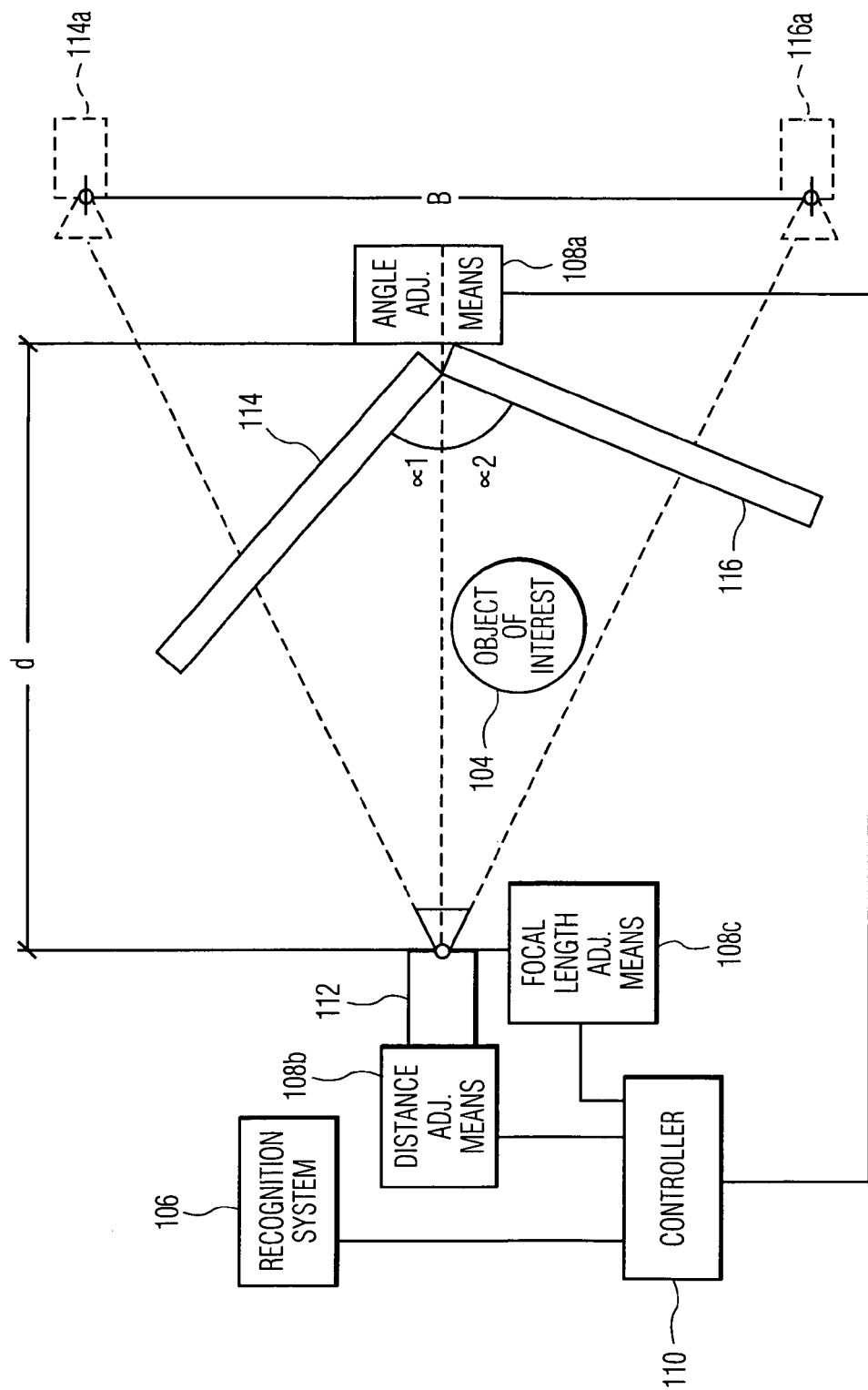
FIG. 2 illustrates a schematic representation of the stereo camera system of FIG. 1 having a first configuration of a stereo imaging means.

Referring now to FIG. 2, there is illustrated a schematic of the stereo camera system 100 of FIG. 1, and having a first configuration of the stereo imaging means 102. The stereo imaging means 102 in the first configuration illustrated in FIG. 2 comprises a camera 112 and a set of mirrors 114, 116. The mirrors 114, 116, are angled with respect to each other at a predetermined angle θ and disposed a predetermined distance d from the camera 112. Such a stereo imaging means is well known in the art for producing a stereo effect in the output of the camera 112. The camera 112 can be a still camera where the stereo image produced thereby is a still image or the camera 112 can be a video camera where the stereo image produced thereby is a sequence of video images.

The adjusting means 108 in such a first configuration preferably comprises adjustment means 108a, 108b, 108c for adjusting the predetermined angle $\theta = \alpha_1 + \alpha_2$ between the set of mirrors 114, 116; for adjusting the predetermined distance d between the camera 112 and the set of mirrors 114, 116; and for changing a focal length of the camera 112, respectively. As discussed above with regard to FIG. 1, the controller 110 controls at least one of the angle, distance, and focal length adjustment means 108a, 108b, 108c, respectively, based on an input signal from the recognition means 106 containing information regarding how far the object of interest 104 is from the camera 112 and/or the relative size of the object of interest 104. Preferably, a combination of all three adjustment means 108a, 108b, 108c are controlled to optimize the spatial resolution of the object of interest 104.

Given the configuration illustrated in FIG. 2, to increase the spatial resolution of a detected object of interest 104, the controller 110 would input the angle adjustment means 108a to decrease angle θ. Similarly, to increase the spatial resolution of a detected object of interest 104, the controller 110 would input the distance and focal length adjustment means 108b, 108c, to decrease distance d and decrease the focal length of the camera 112, respectively.

The controller 110 can be any processor capable of performing the necessary calculations to determine the amount of adjustment to each of the adjustment means in order to increase and/or optimize the spatial resolution of the object of interest, such as a personal computer.

Let B denote the baseline, which is the distance between two virtual cameras 114a, 116a, normal with a respective mirror 114, 116.

$$B = 2Z_c \cdot \sin(\alpha_1 + \alpha_2) \quad (1)$$

To increase resolution in depth, the disparity in range is maximized, denoted by DR, given the constraint that size of the image is fixed with width=Xres, height=Yres, and the operational range is $[X_{min}:X_{max}, Y_{min}:Y_{max}, Z_{min}:Z_{max}]$.

$$DR = f \cdot B \cdot \left( \frac{1}{Z_{min}} - \frac{1}{Z_{max}} \right) \quad (2)$$

Where f is the focal length of the camera 112, $Z_{min}$ and $Z_{max}$ are the minimum and maximum distance between the object of interest 104 and the camera 112.

$$DR = f \cdot Zc \cdot \sin(\alpha_1 + \alpha_2) \cdot \left( \frac{1}{Z_{min}} - \frac{1}{Z_{max}} \right) \quad (3)$$

Assuming pinhole camera model: (and symmetrically for Y-coordinates)

$$\frac{f \cdot dx}{Z_{min}} < \frac{X_{res}}{2} \quad (4)$$

where $dx = X_{max} - X_{min}$
and $X_{min}$ and $X_{max}$ are the minimum and maximum values of x-coordinate of an object in the scene.
Putting Equation (4) in Equation (3):

$$DR = Zc \cdot \sin(\alpha_1 + \alpha_2) \cdot \left( \frac{X_{res}}{2dx} - \frac{f}{\frac{2dx \cdot f}{X_{res}} + dZ} \right) \quad (5)$$

where $$dZ = Z_{max} - Z_{min}$$

Also, let $\phi$ denote the field of view of the camera 112. Then, $$\frac{X_{res}}{2} = f \cdot \tan(\varphi)$$

And $$Z_{min} = \frac{dx}{2\sin(\alpha_1 + \alpha_2 - \varphi)} + Zc \left( \frac{\sin^2(\alpha_1 + \alpha_2)}{\cos(\alpha_1 + \alpha_2)} - \frac{\sin(\alpha_1 + \alpha_2)}{\sin(\alpha_1 + \alpha_2 - \varphi)} \right) \quad (6)$$

Therefore, according to equation (5), to maximize the disparity range DR:

(1) the distance Zc between the camera and the mirror can be increased, which would also increase the minimum distance of the object 104 in scene from the camera 112;

(2) the angle between the mirrors $\theta = \alpha_1 + \alpha_2$ can be increased which would also change the minimum distance of the object 104 in the scene from the camera 112; and/or (3) the focal length f of the camera can be decreased.

Figure 3:
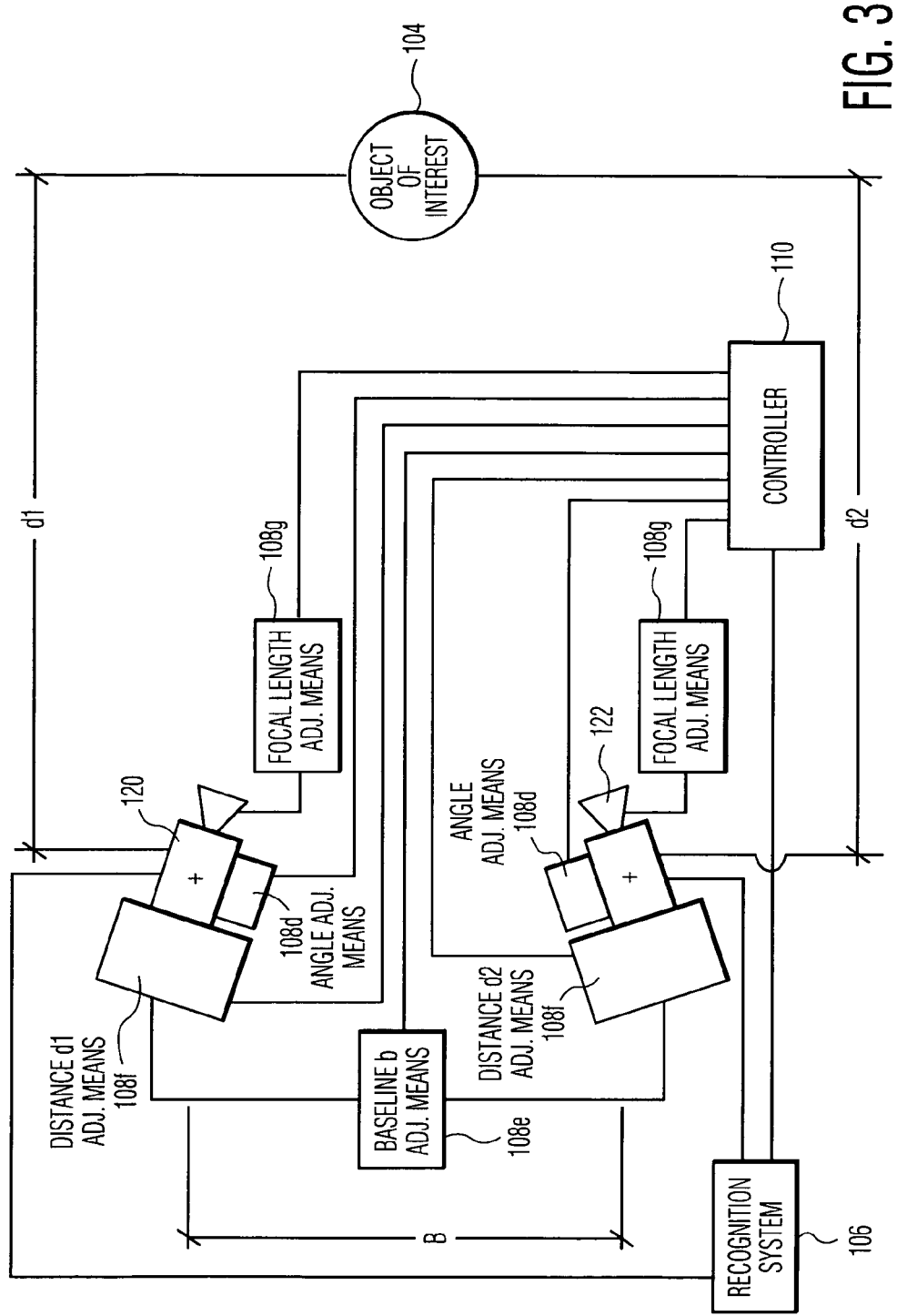
FIG. 3 illustrates a schematic representation of the stereo camera system of FIG. 1 having a second configuration of a stereo imaging means.

Referring now to FIG. 3, there is illustrated a schematic of the stereo camera system 100 of FIG. 1, and having a second configuration of the stereo imaging means 102. The stereo imaging means 102 in the second configuration illustrated in FIG. 3 comprises first and second cameras 120, 122. The first and second cameras 120, 122 are angled a predetermined angle β with respect to each other. Each of the first and second cameras 120, 122 are disposed a predetermined distance d1, d2, respectively, from the object of interest 104 and the cameras are spaced apart a predetermined distance B (generally referred to as the baseline distance). Two cameras are illustrated by way of example only and not to limit the scope or spirit of the present invention. Those skilled in the art will realize that more than two cameras can be utilized to produce a stereoscopic image. Furthermore, as discussed above with regard to the first configuration illustrated in FIG. 2, each of the cameras 120, 122 can be either a still image or video image camera.

The adjusting means 108 in such a second configuration preferably comprises adjustment means 108d, 108e, 108f, 108g for adjusting angle α by adjusting the angle of at least one of the first and second cameras 120, 122, for adjusting the baseline distance b between the first and second cameras 120, 122, for adjusting the distance d1, d2 between either or both of the first and second cameras 120, 122 and the object of interest, and for changing a focal length of at least one of the first and second cameras 120, 122, respectively.

As discussed above with regard to FIG. 2, the controller 110 controls at least one of the angle, baseline, distance, and focal length adjustment means 108d, 108e, 108f, 108g, respectively, based on an input signal from the recognition means 106 containing information regarding how far the object of interest 104 is from the camera 112 and/or the relative size of the object of interest 104. Preferably, a combination of all four adjustment means 108d, 108e, 108f, 108g are controlled to optimize the spatial resolution of the object of interest 104.

Given the configuration illustrated in FIG. 3, to increase the spatial resolution of a detected object of interest 104, the controller 110 would input the angle adjustment means 108d to increase angle α. Similarly, to increase the spatial resolution of a detected object of interest 104, the controller 110 would input the baseline, distance, and focal length adjustment means 108e, 108f, 108g to decrease the baseline distance B, to decrease distances d1 and/or d2, and to decrease the focal length of the camera 112, respectively.

As discussed above, the controller 110 can be any processor capable of performing the necessary calculations to determine the amount of adjustment to each of the adjustment means in order to increase and/or optimize the spatial resolution of the object of interest, such as a personal computer.

In the case where two or more cameras 120, 122 are used, equations (2) and (4) above can be used to determine the amount of adjustment necessary to increase disparity range DR according to equation (2). For instance, the distance B between the cameras 120, 122 can be increased and or the focal length f of the cameras 120, 122 can be increased, which would increase the minimum distance of the object 104 in the scene from the cameras 120, 122.

The adjustment means 108 for adjusting the system parameters such as angles θ and β and distances d, d1, d2, and B are well known in the art and a detailed description is therefore omitted for the sake of brevity. Those skilled in the art realize that such adjustment means can be accomplished by way of linear and rotary motion devices such as linear screws and belt drives and rotary stepper or servo motors, respectively, which are appropriately interconnected with the intended structure to be adjusted.

Those skilled in the art will appreciate that the stereo camera system 100 of the present invention automatically determines the necessary operational range for the object of interest, and adjusts stereo system parameters to achieve better three dimensional spatial resolution. Such an adjustable stereo camera system 100 can provide improved resolution as a preprocessing step for further image analysis steps which demand good resolution in three dimensions (x, y, and depth), such as face, gesture, and body recognition using three dimensional inputs.

Furthermore, the adjustable stereo camera system 100 of the present invention can isolate a volume of interest from the rest of a scene, for example, a person in front of the system 100 and interacting with it in a public environment. The stereo camera system 100 can provide better spatial resolution for analysis of the person and his or her immediate surroundings while eliminating any background activity which can distract or corrupt the analysis.

These objectives and advantages of the present invention can be achieved by a stand-alone system such as those illustrated in the Figures or a system which adapts to and interfaces with exiting stereo imaging means such as those described in FIGS. 2 and 3.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A stereo camera system comprising:
   stereo imaging means for outputting at least one stereo image, said stereo imaging means including:
      a camera;
      a set of mirrors angled with respect to each other at a predetermined adjustable angle relative to a centrally located common plane intersecting said camera, each mirror disposed a predetermined adjustable distance from the camera along the common plane, for directing light from an object reflected in said mirrors along a straight line of sight from said minors to the camera, for producing a stereo effect in the output of the camera;
   recognition means for analyzing stereo image data from the camera to locate an object of interest in a field of view of the camera and to determine a distance of the object of interest from the stereo imaging means and a size of the object of interest, wherein said analysis of the stereo image data includes extracting multiple features from each image and matching the multiple features across different views; and
   adjusting means for automatically changing multiple system parameters independently of one another which affects the spatial resolution of the object of interest in at least one stereo image thereby maximizing a spatial depth resolution of the object based on the located distance of the object from the stereo imaging means and the size of the object, the adjusting means comprising:
      angle adjustment means for independently adjusting a first system parameter comprising the angle of the set of mirrors relative to the centrally located plane;
      distance adjustment means for independently adjusting a second system parameter comprising the distance between the camera and the set of mirrors; and
      focal length adjustment means for independently changing a third system parameter comprising a focal length of the camera,
   wherein the adjusting means automatically changes said multiple system parameters independently of one another based on an input signal from the recognition means including information pertaining to at least one of the distance between the camera and the object of interest and the relative size of the object of interest.

2. The stereo camera system of claim 1, wherein the camera is a still camera and the at least one stereo image is a still image.

3. The stereo camera system of claim 1, wherein the camera is a video camera and the at least one stereo image is a sequence of video images.

4. The stereo camera system of claim 1, further comprising a controller for controlling the angle, distance, and focal length adjustment means based on an input signal from the recognition means.

5. The stereo camera system of claim 1, wherein the recognition means is a stereo vision system.

6. The stereo camera system of claim 5, wherein the recognition means analyzes the stereo image data during operation of the camera.

7. The stereo camera system of claim 1, wherein the mirrors have adjacent ends positioned at a common point.

8. The stereo camera system of claim 7, wherein the minors are disposed for directing the light from the object which is reflected in the mirrors directly from the mirrors to the camera.

9. The stereo camera system of claim 1, wherein each of the angle adjustment means, the distance adjustment means, and the focal length adjustment is separately adjustable relative to the other.

10. A method of stereo imaging using a stereo camera system which includes a camera and a pair of minors separated by a separation distance along a base plane and angled by an angle relative to a common central plane, the method comprising:
    outputting at least one stereo image of an object of interest from the camera;
    analyzing the at least one stereo image output by the camera, wherein said analysis of the at least one stereo image includes:
       determining a distance of the object of interest from the camera and a size of the object of interest, and
       extracting multiple features from each image and matching the multiple features across different views; and
    automatically changing multiple system parameters independently of one another which affects the spatial resolution of the object of interest in at least one stereo image thereby maximizing a spatial depth resolution of the object based on the located distance of the object from the stereo imaging means and the size of the object, wherein changing said multiple system parameters comprises:
       adjusting a first system parameter comprising the angle of the pair of mirrors relative to the centrally located plane based on the analysis of the at least one stereo image;
       adjusting a second system parameter comprising the distance between the camera and the pair of mirrors based on the analysis of the at least one stereo image; and
       changing a third system parameter comprising a focal length of the camera based on the analysis of the at least one stereo image.

11. The method of claim 10, wherein the pair of mirrors abut at and pivot on the common central plane.

12. The method of claim 10, wherein the at least one stereo image includes a series of stereo video images and the analyzing step further includes:
    analyzing the series of video images during the outputting of the series of video images.

* * * * *